July 27, 1948.  W. H. WANNAMAKER, JR  2,446,163
ELECTRIC PROPORTIONING CONTROL APPARATUS WITH RESET
Filed Dec. 12, 1945  2 Sheets-Sheet 1
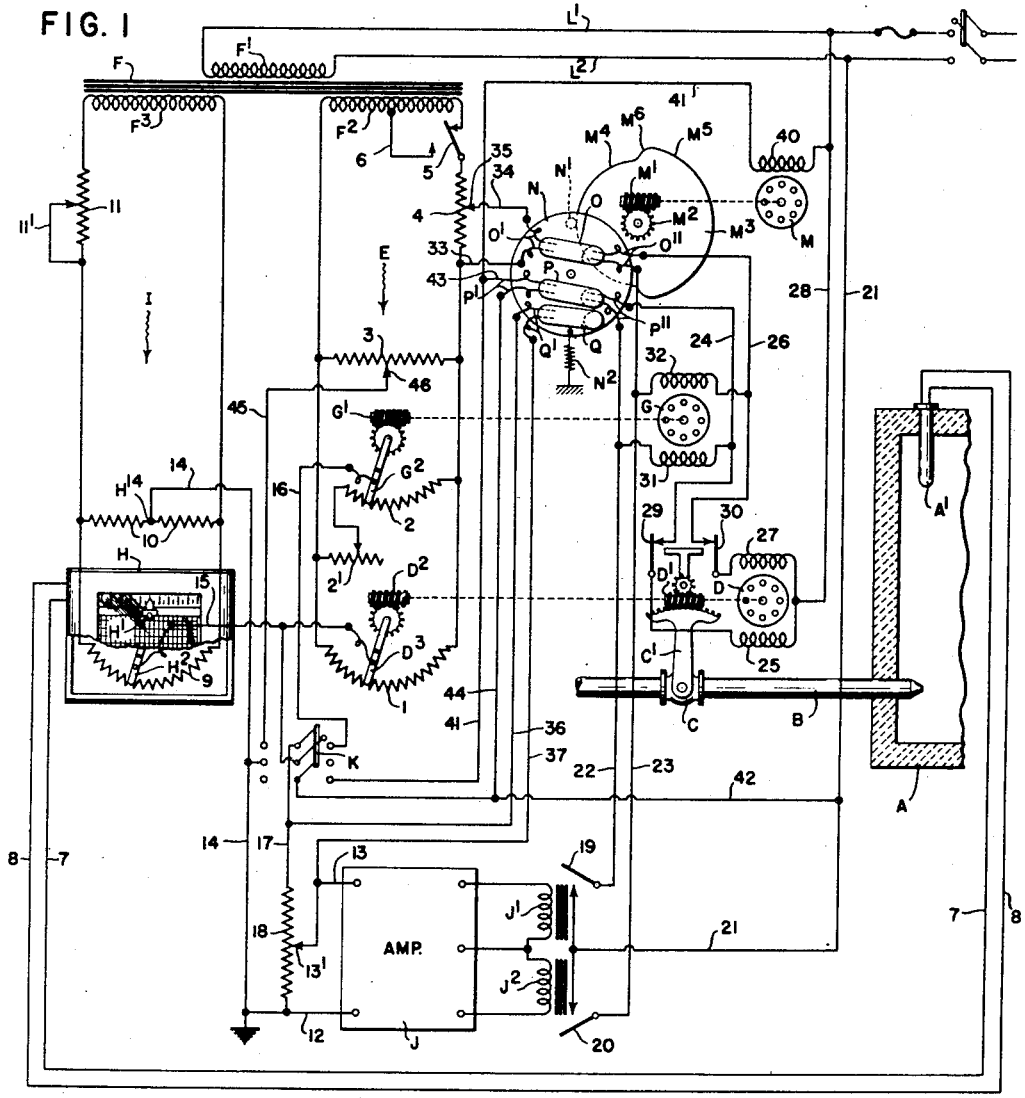
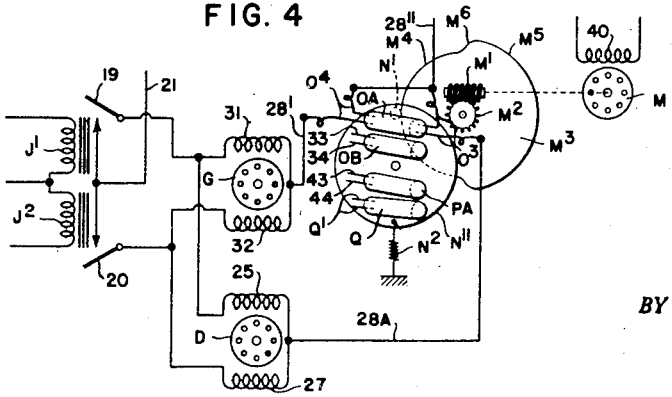
*INVENTOR.*
WILLIAM H. WANNAMAKER JR.
BY Arthur H. Swanson
ATTORNEY.

July 27, 1948.  W. H. WANNAMAKER, JR  2,446,163
ELECTRIC PROPORTIONING CONTROL APPARATUS WITH RESET
Filed Dec. 12, 1945  2 Sheets-Sheet 2
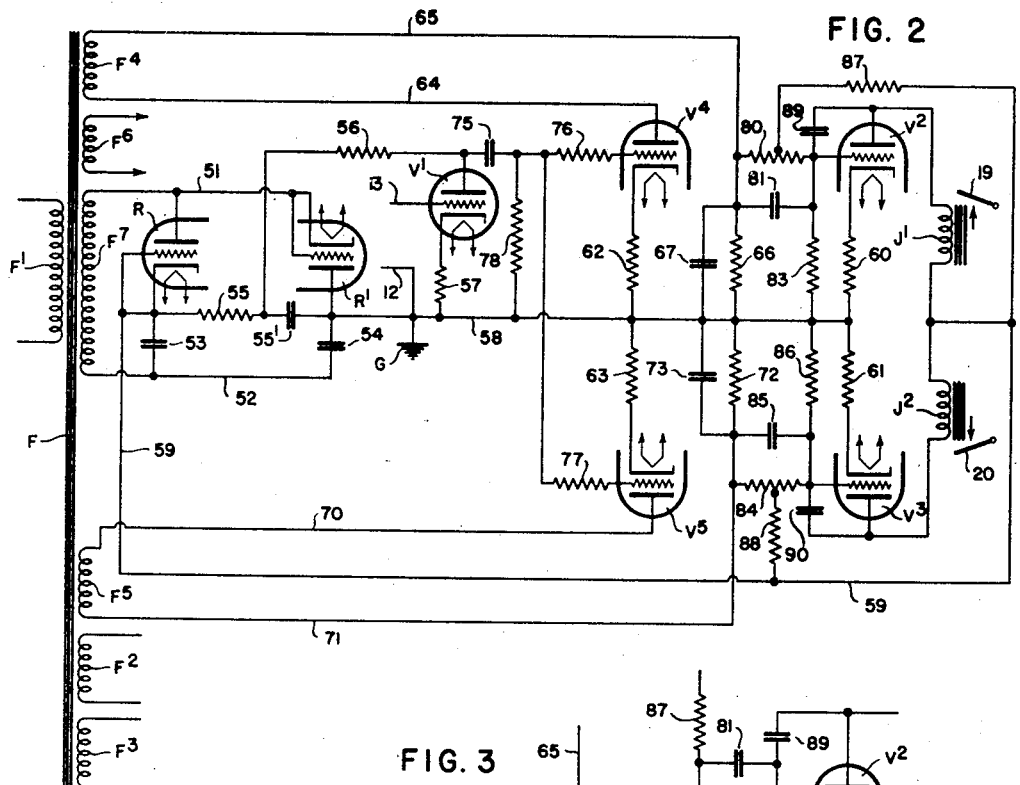
INVENTOR.
WILLIAM H. WANNAMAKER JR.
BY Arthur H. Swanson
ATTORNEY.

Patented July 27, 1948

2,446,163

UNITED STATES PATENT OFFICE 2,446,163

ELECTRIC PROPORTIONING CONTROL APPARATUS WITH RESET

William H. Wannamaker, Jr., Flourtown, Pa., assignor to The Brown Instrument Company, Philadelphia, Pa., a corporation of Pennsylvania Application December 12, 1945, Serial No. 634,556

15 Claims. (Cl. 318—29)

A general object of the present invention is to provide an improved electrical control system which is of the proportioning type and includes means for automatically effecting reset adjustments. A more specific object of the invention is to provide an electric proportioning system with a novel and effective means for automatically making reset adjustments which vary in magnitude and rate with the magnitude of the variations in the control quantity or condition which create the need for the reset adjustments.

A primary and practically important object of the invention is to provide a simple and effective control system of the type specified, in which the motor used to actuate such a relatively high power, slow moving mechanism as is required to position a control valve in response to potentiometer measurements, may be controlled by electromagnetic relays having their coils actuated by the output currents of electronic valves. Such a control system is adapted to give long life and dependable service and is inherently substantially less costly than systems in which the drive motors have their windings directly energized by the output currents of electronic valves.

My improved control system is characterized by its provisions through which a desirable motor damping action is obtained by making the relay energizing currents depending both upon the magnitude and upon the rate of change of the deviation of the actual value of the controlling condition or quantity from its normal or control point value. With my improved control system it is neither desirable nor practically feasible to attain final balance through a substantial coasting movement of the rebalancing motor, and in its preferred form my improved control system includes relay circuit damping means which didirectly contribute to the attainment of final balance in a plurality of short adjustment steps.

In my co-pending application Serial No. 634,557 filed December 12, 1945, I have disclosed and claimed forms of apparatus for attaining the above mentioned objects, and a general object of the present invention is to provide apparatus for obtaining those objects differing from that disclosed in said co-pending application and having certain desirable features and characteristics not possessed by the apparatus disclosed in said co-pending application.

Another practically important object of the invention claimed herein is the provision of novel means for operating a reversible control motor and a reversible reset motor during alternating periods, and for controlling the operation of said motors through a bridge circuit maintained in such different conditions during the alternate periods that when the actual and normal values of the controlling condition are different, the bridge circuit if balanced in either of its two conditions will be unbalanced when in its other position.

A specific object of the invention is to control the operation of the control and reset motors through an amplifier which is automatically adjusted to make its sensitivity higher during the periods in which the reset motor operates and during short initial portions of the periods in which the control motor operates than during the final portions of the last mentioned periods.

Another specific object of the invention is to adapt the control system for purely automatic operation, or in response to manual control adjustments which determine the value of the control condition which the control system tends to maintain.

My invention claimed herein comprises improvements in method and improvements in apparatus.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 1 is a diagrammatic representation of a preferred form of my improved control system;

Fig. 2 is a diagram illustrating details of an amplifier circuit system arrangement included in the system shown in Fig. 1;

Fig. 3 is a diagram illustrating a modification of the amplifier shown in Fig. 2;

Fig. 4 is a diagram illustrating a modification of a portion of the control system shown in Fig. 1; and Fig. 5 shows a modification of the apparatus shown in Fig. 4.

In Fig. 1 I have illustrated a preferred embodiment of the present invention for use in controlling the temperature in a furnace A which is heated by the combustion of fluid fuel supplied through fuel supply pipe B at a rate regulated by the adjustment of a feed valve C.

As diagrammatically shown, the adjustment of the valve C is effected by the oscillation of a valve member C' which comprises a gear segment having its gear teeth engaged by a worm D' rotated by a reversible electric valve motor D. The shaft of the motor D carries a second worm $D^2$ in mesh with teeth of a gear segment portion of a contact member $D^3$. The rotative movements of the motor D which adjust the valve C through the worm D' operate through the worm $D^2$ to effect corresponding follow-up adjustments of the contact $D^3$ along the slide wire resistance 1 of a valve bridge circuit E, in the usual proportioning system manner.

The valve bridge circuit E is shown as energized by the secondary winding $F^2$ of a transformer F having its primary winding F' connected to alternating current supply conductors $L^1$ and $L^2$. The slide wire resistance 1 is connected to the energizing winding $F^2$ in parallel with slide wire resistors 2 and 3. As shown the resistor 2 is manually adjustable to include more or less of a variable resistance section 2'. The bridge E also includes a sensitivity regulating resistance 4. In one condition of the apparatus all of the resistance 4 is included in the connection between one terminal of each of the resistors 1, 2 and 3 and one terminal of the energizing winding $F^2$. In an other condition of the apparatus, more or less of the resistance 4 is short circuited as hereinafter described. As shown, the bridge circuit E also includes a switch 5 through which the resistance 4, and thereby the resistors 1, 2 and 3, may be connected to one end of the winding $F^2$, or may be connected through a tap 6 to an intermediate portion of the winding $F^2$.

The control system shown in Fig. 1 comprises a reversible reset motor G, the shaft of which carries a worm G' in mesh with gear teeth on the hub portion of a contact arm $G^2$, which is adjusted along the resistor 2 by the motor G, when the latter is operated as hereinafter described.

As shown in Fig. 1, the control temperature of the furnace A is measured by a thermocouple A' having its terminals connected by conductors 7 and 8 to the terminals of an instrument H. The latter may well be, and as shown, is a recording potentiometer controller of known type including a marking element H' and a pivoted contact arm $H^2$. The marking element H' and pivoted contact arm $H^2$ are each adjusted by the instrument as the thermocouple voltage varies but in Fig. 1 the element H' is in its control point or normal temperature position and the control $H^2$ is shown in a lower temperature position.

The contact arm $H^2$ engages the slide wire resistance element 9 of an instrument bridge circuit which also includes a resistance 10 connected, in parallel with the slide wire resistor 9, to the bridge energizing winding $F^3$. The latter is a secondary winding of the transformer F. As shown, one terminal of the winding $F^3$ is connected to the corresponding ends of the resistances 9 and 10 through a resistance 11, more or less of which may be short circuited by a shunt 11' to thereby vary the throttling range of the control system, as hereinafter described.

Whether the control system shown in Fig. 1 operates as an automatic system or as a manual control system depends on whether a switch K is in its position at the right or at the left, respectively, of its intermediate position shown in Fig. 1. In the automatic control position of the switch the output terminals of the valve bridge E and of instrument bridge I are connected in series in a control circuit including the input terminals 12 and 13 of an electronic amplifier J which is shown in more detail in Fig. 2. Said control circuit includes conductors 14, 15, 16 and 17. The conductor 14 connects the amplifier terminal 12 to the resistance 10 at a point $H^{14}$ midway between the ends of the latter. The conductor 15 connects the contact $H^2$ of the bridge I to the contact $D^3$ of the bridge E. The conductor 16 connects the reset contact $G^2$ to one terminal of the switch K. The latter, as shown, is a three-pole, double-throw switch. In its automatic control position one blade of the switch K connects the conductor 16 to one end of a conductor 17 having its opposite end connected to the amplifier terminal 13. As shown, the conductor 17 is directly connected to the amplifier terminal 12 through a high resistance 18 and the amplifier terminal 13 terminates in a contact 13', in sliding engagement with a portion of the resistance 18 adjacent to conductor 17. As shown, the input terminal 12 of the amplifier J, and the mid-point $H^{14}$ of the resistance 10 of the bridge I are connected to ground.

Depending upon conditions of operation hereinafter explained, the signal impressed on the input terminals 12 and 13 of the amplifier J is of one or the other of two phases which are displaced from one another by 180 degrees. When the impressed signal is of one phase, the amplifier J operatively energizes a relay winding J' and thereby closes a normally open relay switch 19. When the control signal is of the second phase, the second relay winding $J^2$ of the amplifier J is energized and closes the normally open relay switch 20.

The relay switches 19 and 20 in conjunction with cyclic operating switches O, P and Q, control the energization of the valve motor D and reset motor G. Advantageously, and as shown, switches O, P and Q are mercury switches which are periodically tilted back and forth between first and second operative positions by a constantly runing timing motor M. As diagrammatically shown, the shaft of the timing motor M carries a worm M' in mesh with a worm gear $M^2$ carried by the shaft of a constantly rotating cam disc $M^3$. The disc $M^3$ maintains a pivoted disc N in one angular position during one half, and in a different angular position during the other half of each revolution of the disc $M^3$. As shown, the edge of the disc $M^3$ comprises two arc portions $M^4$ and $M^5$, each extending circularly about the axis of the disc $M^3$ for approximately 180°, though said portions need not be of equal angular extent.

The radius of curvature of the arc $M^4$ is shorter than that of the arc $M^5$. The adjacent ends of the edge portions $M^4$ and $M^5$ are connected by cam shoulders $M^6$. The disc N carries a pin N' which is held in engagement with the edge of the disc $M^3$ by a bias spring $N^2$. In consequence, the disc N occupies one angular position when the pin N' engages the edge portion $M^4$ and occupies a different angular position when the pin N' engages the disc edge portion $M^5$.

The envelopes or tubular bodies of the mercury switches O, P and Q are mounted on the disc N in such manner that with the pin N' in engagement with the edge portion $M^5$, the left ends of the switches O, P and Q are depressed so that the mercury partially filling each tube may connect the corresponding pair of terminals or electrodes O', P' and Q' extending into the left ends of the envelopes of the switches O, P and Q, respectively. As the pin N' moves out of engagement with the surface $M^5$ and into engagement with the surface M⁴, the switch envelopes are tilted so that the mercury therein then passes into their depressed right ends. For a purpose hereinafter explained, the switch envelopes are preferably so relatively inclined as shown, or otherwise so arranged that the mercury connection between the contacts Q' is maintained momentarily after their clockwise tilting has disconnected contacts O' and P'. Contacts O" and P" extending into the right ends of the switches O and P are mercury connected when those switch ends are depressed. The switch Q has no contacts extending into its right end.

With the right ends of the switches O and P depressed as shown, the motor D may be energized for operation in one direction or the other by closure of one or the other of the relay switches 19 and 20, but the energization of the reset motor G is then prevented. When the left ends of the switches O and P are depressed, the motor G is energized for operation in one direction or the other by the closure of the switch 19 or the switch 20, but the energization of the valve motor D is then prevented.

The circuit connections through which the operation of the motors G and D are thus controlled by the switches 19, 20, O and P comprise circuit elements 21—30. Each of the switches 19 and 20, when in its closed position, is connected to the supply conductor L² by conductor 21. Conductor 22 connects the switch 19 to one of the terminals P" of the switch P. Conductor 23 connects the switch member 20 to one of the terminals O" of the switch O. Conductor 24 connects the second terminal P" to one terminal of field winding 25 of motor member D. Conductor 26 connects the second terminal O" of the switch O to one terminal of the second field winding 27 of the motor D. Conductor 28 connects the second terminal of each of the field windings 25 and 27 to the supply conductor L'. As shown, the conductor 24 and winding 25 are connected through a normally closed limit switch 29, and the conductor 26 is connected to the winding 27 through the normally closed limit switch 30. The motor G has one field winding 31 connected between the conductors 22 and 24 and has a second field winding 32 connected between the conductors 23 and 26.

In the condition of the apparatus shown in Fig. 1 the mercury in the switch P connects the contacts P" and thereby short circuits the field winding 31. Similarly the mercury in the switch O then connects the contacts O" and thereby short circuits the field winding 32. In consequence the motor D is energized on the closure of either switch 19 and 20 while the motor G remains unenergized. When the disc N occupies its second position, so that the right ends of the switches O and P are raised, those switches no longer short circuit the field windings 31 and 32 of the motor G, and on the closure of the switch 19, the field winding 31 is then operatively energized by current flow in series through the field windings 31 and 25 between the conductors 22 and 28. Similarly, on the closure of the switch 20, the field winding 32 of the motor G is operatively energized by current flow in series through the field windings 32 and 27.

For their intended operation, the reset motor field windings 31 and 32 are so proportioned relative to the valve motor field windings 25 and 27 that the windings 31 and 32 will be energized by currents of insufficient strength to energize the windings 25 and 27, respectively. Thus the two motors D and G are never simultaneously energized.

When turned into their positions in which the operation of the reset motor G is permitted, the switches O and Q make control circuit adjustments which augment the tendency of the amplifier J to close one or the other of the switches 19 and 20 and thus insure a corresponding operation of the reset motor G. Thus, when the left end of the switch O is lowered so that the mercury connects its contacts O', a portion of the resistance 4 in the valve bridge circuit is short circuited. This changes the potential relation previously existing between the contact G² and D³. The short circuiting of more or less of the resistance 4 occurring when the left end of the switch O is depressed results from the fact that one end of the resistance 4 is connected by conductor 33 to one of the switch contacts O' while the other switch contact O' is connected by a conductor 34 and a slider contact 35 to the resistance 4 at a variable point displaced from the point to which the conductor 33 is connected. The actual magnitude of the end portion of resistance 4 then short circuited depends, of course, upon the adjustment of the slider contact 35.

The lowering of the left end of the switch Q increases the sensitivity of the amplifier J by making the potential difference between the input terminals 12 and 13 of the amplifier J equal to the full potential difference between the conductors 14 and 17. The switch Q accomplishes this by short circuiting the portion of the resistance 18 which is normally interposed between the conductor 17 and the amplifier terminal 13. That portion of the resistance 18 is short circuited when the left end of the switch Q is depressed by a short circuiting shunt comprising conductors 36 and 37 and the contacts Q'. The conductor 36 connects one of the contacts Q' to the conductor 17 and the conductor 37 connects the second contact Q' to the amplifier terminal 13.

The switch P serves to insure that when the switch K is adjusted from its automatic control position to its manual control position, the timing motor M will not stop in a position in which the switches O and Q will short circuit portions of the resistances 4 and 18, respectively. When the switch K is turned into its manual control position it opens the normal energizing circuit for the motor M. That circuit includes the field winding 40, which has one terminal connected to the supply conductor L', and a conductor 41 which connects the other terminal of winding 40 to one terminal of the switch K. That switch terminal is connected by the lower blade of the switch K to a conductor 42 when the switch K is in its automatic control position. The conductor 42 connects the lower blade of the switch K to the conductor 21 and thereby to the supply conductor L².

If the switch P has its left end elevated when the switch K is turned from its automatic position into its manual control position, the operation of the motor M is immediately interrupted. If, however, the switch K is adjusted from its automatic control position into its manual control position at a time when the left end of the switch P is depressed, the last mentioned switch operates to maintain the energization of the motor M until the edge portion M⁴ of the disc M³ is turned into the position in which it permits the disc N to turn clockwise and thereby raise the left end of the switch P. The switch P prolongs the energization of the timing motor M, as just described, by virtue of the fact that one of the contacts P' of the switch P is connected by a conductor 43 to the conductor 41 while the second contact P' is connected by a conductor 44 to the conductor 42.

In the normal operation of the system shown in Fig. 1 with the switch K in its right-hand or automatic control position, and with stable operating conditions, the thermocouple A' will be at the desired temperature and the instrument marking element H' and contact H² will be in their control point positions, assumed herein to be their mid positions. In consequence there will then be no potential difference between the output terminals H¹⁴ and H² of the instrument bridge I, or between the output terminals G² and D³ of the valve bridge E. In consequence there will then be no potential difference between the amplifier input terminals 12 and 13. On a decrease in thermocouple temperature, the corresponding adjustment of the contact H², assumed to be in the clockwise direction, unbalances the control circuit. The resultant signal current flow between the conductors 14 and 17 will be in the phase relation to the supply conductor voltage required to energize the relay winding J'. The phase of the signal potential on a control temperature increase is that required to energize the relay winding J².

When unbalanced as just described, the control system cannot be stabilized in a rebalanced condition without adjustment of the fuel valve C effected by operation of the motor D. Ordinarily the initial operation of the motor D will give the contact D³ the movement required to neutralize the signal potential previously impressed upon the amplifier. However, when thereafter the timing motor M short circuits the resistance 4, the control system is thereby again unbalanced, and the reset motor G then operates to adjust the contact G² in the direction to dissipate the bridge rebalancing action produced by the preceding operation of the valve motor D. Subsequently, when the timing motor M opens the short circuit about the resistance 4, the motor control circuit is again unbalanced, and the valve motor D is again energized for operation in the direction to give the fuel valve C a further adjustment in the direction of its original adjustment.

Thus in rebalancing the control system following a furnace load change a series of reset adjustments are made by the reset motor G. Those adjustments are effected during regularly recurring periods and the magnitude of each is proportional to the existing deviation of the actual furnace temperature from the normal or control value of that temperature. In consequence the aggregate or total reset adjustment made as a result of a load change is made at a rate dependent on the deviation, during the time required for such aggregate adjustment, of the actual furnace temperature from the normal or control point temperature.

The increase in relay sensitivity, effected when a portion of the resistance 18 is short circuited, contributes to the accuracy of control of the resetting operations. Furthermore, with the switches arranged as previously explained so that when the disk N is tilted clockwise the movement of the mercury in the switch Q is slower than in the switches O and P, the control motor D may be operatively energized before the sensitivity of the amplifier J is reduced. In consequence, the appropriate relay J' or J² may then be momentarily energized as a result of an extent of unbalance in the control circuit which would be too small to energize the relay if the amplifier had only the sensitivity maintained during the periods in which the resistance 18 is not short circuited. The lag in the reduction in the amplifier sensitivity occurring when the switch Q is tilted clockwise thus contributes to improved valve control by avoiding or minimizing objectionable dead zone interference with the desired control operations.

The manual adjustment of the shunt 11' to increase or decrease the resistance 11 in the instrument bridge circuit I respectively decreases or increases the potential drop in the bridge circuit resistances 9 and 10. The effects of thus increasing or decreasing the potential drop along the slide wire resistance 9, is to respectively decrease or increase the throttling range of the control system.

The manual adjustment which increases or decreases the amount of the resistance 2' in series with the slide wire resistor 2 respectively increases or decreases the amount of movement of the reset motor G required to rebalance the system when, following an adjusting operation of the motor D, the timing motor moves switches O, P and Q counter-clockwise and thereby unbalances the bridge circuit E by short circuiting more or less of the resistance 4 while at the same time conditioning the reset motor G for operation.

When the switch K is adjusted into its left-hand or manual control position it eliminates the control functions and capacities which the reset contact G² and the instrument contact H² have while the switch K is in its right-hand or automatic control position. The contact G² is thus rendered inoperative by the disconnection of the conductors 16 and 17. When the switch K is turned into its left-hand position, it connects the conductor 17 to a conductor 45 and thereby to a slider contact 46 which is manually adjustable along the slide wire resistance 3 of the valve bridge E. In the manual control condition of the apparatus shown in Fig. 1 a signal potential is impressed on the amplifier terminals 12 and 13 through the slide wires 1 and 3 at times when there is a potential difference between contacts D³ and 46. Whether the phase of the signal potential then impressed on the amplifier terminals 12 and 13 is that required to energize the relay winding J' or relay winding J² depends upon whether the potential difference between the contacts D³ and 46 is in a direction to be eliminated by a clockwise or a counter-clockwise adjustment of the contact arm D³.

In the manual control condition of the apparatus shown in Fig. 1, there is no automatic reset, and an increase or decrease in the heat requirement or load of the furnace A tends to produce a decrease or an increase, respectively, in the temperature of the thermocouple A'. Variation in the furnace heat requirement can be compensated for so as to maintain the temperature of thermocouple A' approximately constant by suitable adjustments of the contact 46 along the slide wire 3. With a constant furnace load, a manual adjustment of the contact 46 along the resistance 3 is in effect a control point adjustment which varies the temperature at which the thermocouple A' is maintained.

While for the general purposes of the control system shown in Fig. 1 the amplifier J may take varying forms, special advantages are obtained with an amplifier J of the type illustrated in Fig. 2. In the amplifier arrangement shown in Fig. 2, the amplifier input terminal 13 is directly connected to the control grid of an amplifying triode V', and the terminal 12 is connected through a biasing resistance 57 to the cathode of the triode V'. Two triodes R and R' are used in Fig. 2 as rectifiers to provide unidirectional voltage for energizing the plate circuit of the amplifier triode V', and for energizing the plate circuits of relay energizing triodes $V^2$ and $V^3$. Alternating voltage is applied to the plate circuits of voltage amplifier triodes $V^4$ and $V^5$ from secondary windings $F^4$ and $F^5$, respectively, of the transformer F, in such manner that the respective voltages on the plates of the triodes $V^4$ and $V^5$ are 180° out of phase.

In the arrangement shown, when the triode V' impresses no signal on the control grids of the triodes $V^4$ and $V^5$, those triodes conduct sufficient current to maintain the triodes $V^2$ and $V^3$ substantially non-conductive, so that both relays J' and $J^2$ are then deenergized. On the assumptions made above, a drop in the temperature of the thermocouple A results in the impression of a signal on the control grids of the triodes $V^4$ and $V^5$ of such phase that the control grid of the triode $V^4$ is driven in the negative direction during the half cycle that its plate is positive. The triode $V^4$ then becomes substantially non-conductive with the result that the triode $V^2$ then becomes conductive and energizes the relay winding J'. When a signal of opposite phase is impressed on the control grids of the triodes $V^4$ and $V^5$, the control grid of triode $V^5$ is driven negative during the half cycle that its plate is positive. This makes the triode $V^3$ conductive and effects the energization of the relay winding $J^2$.

As shown, the transformer F includes a secondary winding $F^6$, the purpose of which is to provide heating current to the cathode heating filaments of the various valves R and R', V', $V^2$, $V^3$, $V^4$ and $V^5$. The rectifier triodes R and R' are energized by alternating current supplied by a secondary winding $F^7$ of the transformer F. One terminal of the winding $F^7$ is directly connected through a conductor 51 to the anode of the triode R, and to the cathode and control grid of the triode R'. The second terminal of the transformer $F^7$ is connected by a conductor 52 to one terminal of each of condensers 53 and 54. The second terminal of the condenser 53 is connected to the cathode of the rectifier triode R, and the second terminal of the condenser 54 is connected to the anode of the triode R'. The cathode of triode R is connected through a resistance 55 and a condenser 55' to the anode of the triode R'. The connected terminals of the resistance 55 and condenser 55' are connected by a resistance 56 to the anode of the amplifier triode V'. The cathode of the triode V' is connected through resistance 57 to a conductor 58 and thereby to the anode of triode R' and to the end of the resistance 18 to which the amplifier input terminals 12 and 13 are connected.

As will be apparent, the transformer secondary $F^7$, the valves R and R' and the condensers 53 and 54 form a so-called voltage doubler circuit which supplies suitably high D. C. voltage to the plate circuits of the triodes $V^2$ and $V^3$. The negative terminal of the double circuit is connected by the conductor 58 and resistances 60 and 61 to the cathodes of the triodes $V^2$ and $V^3$, respectively. The positive terminal of the doubler circuit is connected by the conductor 59 to the connected terminals of the relay coils J' and $J^2$ which have their other terminals connected to the anodes of the triodes $V^2$ and $V^3$, respectively.

The conductor 58 is also connected through the resistances 62 and 63 to the cathodes of the triodes $V^4$ and $V^5$, respectively. One terminal of the transformer secondary $F^4$ is connected to the anode of the triode $V^4$ by a conductor 64 and the other terminal of the secondary $F^4$ is connected by a conductor 65, a resistance 66, and a condenser 67 in shunt with said resistance, to the conductor 58, and is thereby connected through the resistance 62 to the cathode of the triode $V^4$. One terminal of the transformer secondary $F^5$ is connected by a conductor 70 to the anode of the triode $V^5$, and the other terminal of the secondary $F^5$ is connected by a conductor 71 and resistance 72, and a condenser 73 in parallel with the resistance 72, to the conductor 58, and is thereby connected through the resistance 63 to the cathode of the triode $V^5$.

The output circuit of the triode V' is coupled to the input circuits of the tubes $V^4$ and $V^5$ by means including a condenser 75 which has one terminal connected to the anode of the tube V'. The other terminal of the condenser 75 is connected to the control grid of the tube $V^4$ through a resistance 76 and is connected to the control grid of the tube $V^5$ through a resistance 77, and is connected through a resistance 78 to the conductor 58. The conductor 58 as previously explained, is connected to the cathode of triode V' by the resistance 57, and is connected to the cathodes of triodes $V^4$ and $V^5$ by the resistances 62 and 63, respectively.

In addition to the resistance 66 and condenser 67, the coupling connection between the output circuit of the triode $V^4$ and the input circuit of the triode $V^2$ includes a resistance 80 and a condenser 81 connected in parallel with said resistance between the conductor 65 and the control grid of the triode $V^2$. Said control grid is also connected through a resistance 83 to the conductor 58 and thereby through the resistance 60 to the cathode of the triode $V^2$. Similarly, the output circuit of the triode $V^5$ is connected to the input circuit of the triode $V^3$ by coupling means including the previously mentioned resistance 72 and condenser 73, and also including a resistance 84 and a condenser 85 in parallel with said resistance which connect conductor 71 to the control grid of the triode $V^3$. That control grid is also connected by a resistance 86 to the conductor 58 and thereby through resistance 61 to the cathode of the triode $V^3$. The control grids of the triodes $V^2$ and $V^3$ are subjected to a positive biasing action by resistances 87 and 88 which connect the conductor 59 to said control grids through intermediate points of the resistances 80 and 84, respectively.

A condenser 89 is connected between the control grid and anode of triode $V^2$ and a condenser 90 is connected between the control grid and anode of the triode $V^3$. With substantially smooth rectified current supplied to the output circuits of the triodes $V^2$ and $V^3$, the condensers 89 and 90 serve as degenerative couplings which tend to eliminate relay hum. The condensers 89 and 90 may be quite small and therefore are less expensive than the filter condensers customarily used in shunt to relay windings to prevent hum in apparatus of this general type. Said condensers should have as small a time constant as possible to avoid sluggishness in relay operation and still avoid relay chatter.

As previously stated, when no signal is impressed on their control grids, the triodes V⁴ and V⁵ are conductive and the voltage drops through the resistances 66 and 72 lower the potentials of the control grids relative to the cathodes of the valves V² and V³ which are then practically non-conductive. In consequence, the relay windings J' and J² are then deenergized. When a signal of the proper phase is impressed on the input circuit of triode V⁴ the latter becomes non-conductive because its control grid is driven negative during the half cycle in which the corresponding anode is positive The resultant reduction in the potential drop in resistance 66, permits a plate current flow through the triode V² which energizes the relay winding J'. The relay winding J² is similarly energized when a control signal of proper phase is impressed on the control grid of the valve V⁵ and the decreased potential drop in resistance 72 makes triode V³ conductive.

The described coupling circuit connections between the output circuits of the triodes V⁴ and V⁵ and the input circuits of the triodes V² and V³, respectively, serve the purpose of causing the relay windings J' and J² to be deenergized at the instant that the control circuit is rebalanced or even during the period in which its rebalance is being effected but has not been completed. The described coupling connections accentuate the effect of both a rising and a falling signal voltage on the input circuits of the triodes V² and V³. Consider, for example, the action which occurs when, following a load change which makes the valve V⁴ practically non-conductive and makes the valve V² conductive, the system again approaches balance and the current in the output circuit of the tube V⁴ begins to increase. As that current builds up, the resistance 66, the condenser 67 in parallel therewith, the condenser 81, and the associated resistances 80 and 83 connected to the control grid of the valve V², coact to expedite the rate at which the potential of said control grid becomes increasingly negative relative to the cathode of the valve V².

As the control system approaches balance, the coupling connections between the valves V⁴ and V⁵, respectively, operate not only to increase the rapidity with which the control grid of one of the valves V² and V³ becomes increasingly negative relative to the corresponding cathode, but also to make the control grid of the other valve more positive relative to the cathode of that valve. It is possible by a suitable selection of circuit component values, not only to deenergize the previously energized relay J' or J², but also to momentarily energize the other of those relays, prior to the complete rebalancing of the control system. The momentary energization of the other relay as just described, energizes the control motor for operation in the reverse direction and thereby subjects the motor to a positive braking action practically eliminating the tendency of the motor to coast.

The action of the valve coupling provisions just described contributes to a reduction in the length of the individual adjustment steps effected as balance of the control system is approached, following the unbalancing of the system by a load change. As those skilled in the art will recognize, the reduction in the individual magnitude of the final rebalancing adjustment steps contributes to efficient control by reducing the tendency to overtravel, and objectionable dead zone effects.

As those skilled in the art will understand, the values of capacitances and resistances associated with the control grids of the valves V² and V³ may vary widely with conditions, but by way of illustration and example, and not by way of limitation, I note that in a system energized by 60 cycle alternating current, the resistances 66, 72, 83 and 86 may each have a value of 1 megohm, each of the condensers 67 and 73 may have a capacitance of .25 mfd., each of the condensers 81 and 85 may have a capacitance of .1 mfd., and resistances 80 and 84 may each have a value of 5 megohms.

The capacitance and resistance values just stated are also suitable for operation when the system is energized by 25 cycle alternating current, but in such case it is desirable to connect the grid circuits of the valves V² and V³ by a condenser 95, as shown in Fig. 3. In respect to hum reduction, the Fig. 3 arrangement also differs advantageously from that shown in Fig. 2 in the replacement of resistance 80 by separate resistances 80A and 80B, and the replacement of resistance 84 by separate resistances 84A and 84B, and I now prefer the Fig. 3 arrangement without the condenser 95, to the Fig. 2 arrangement for 60 cycle operation.

In addition to its operating advantages, the amplifier arrangement shown in Fig. 2 has the practically important safety advantage that if any one of the tubes of the amplifier should fail or be withdrawn from its socket, no objectionable motor operation will result. As previously explained, the triodes V⁴ and V⁵ are normally conductive, the triodes V² and V³ are normally non-conductive, and the relay windings J' and J² are normally deenergized. Ordinarily, the triodes V² and V³ will be contained in the same bottle, and if that bottle is withdrawn from its socket no relay or motor operation will result. Furthermore, if the triodes V² and V³ are in separate bottles, the withdrawal of either bottle from its socket or the failure of the triode therein, can produce no objectionable operation since that triode is normally inoperative.

If the pre-amplifier tube V' should fail, no energization of either relay winding J' or J² and hence no operation of either motor D or G will result, because the triodes V² and V³ are normally non-conductive.

With triodes V⁴ and V⁵ contained in the same bottles, the withdrawal of the bottle from its socket will not result in motor operation, since both of the triodes V² and V³ will then be conductive and both relay windings J' and J² will be energized and this results in motor energization for operation in each direction and this prevents motor operation in either direction.

If one only of triodes V⁴ and V⁵ should fail or be removed, the corresponding tube V² or V³ will be rendered conductive and the corresponding relay winding J' and J² will then be energized and cause motor operation in one direction. Such motor operation, however, unbalances the control circuit in the proper direction to cause the other triode V⁵ or V⁴ to become non-conductive and thereby to cause the other triode V³ or V² to become conductive. When this occurs both of the relay windings will be simultaneously energized and when one winding of the motor is energized the second winding of the motor is also energized and the motor stalls.

Various modifications of the apparatus shown in Fig. 1 may be made, and two such modifications are shown by way of example in Figs. 4 and 5. In the arrangement shown in Fig. 4 the field winding 25 of the motor D has one terminal connected to the relay switch 19 and the field winding 27 has one terminal connected to the relay switch 20 and each of said switches when in its closed condition is connected to the conductor 21 which may be connected to the supply conductor L² as in the arrangement shown in Fig. 1. The second terminals of the windings 25 and 27 are connected by a conductor 28A to one of the terminals O³ extending into the right end of the mercury switch OA. The cooperating switch terminal O is connected to a conductor 28'' which may be connected to the supply conductor L¹ to which the conductor 28 of Fig. 1 is connected. In Fig. 4 one terminal of the reset motor field winding 31 is connected to the relay switch 19 and one terminal of the reset motor winding 32 is connected to the relay switch 20. The other terminals of the windings 31 and 32 are connected by a conductor 28' to one of a pair of switch terminals O⁴ extending into the left end of the mercury switch OA. The second terminal O⁴ is connected to the previously mentioned conductor 28''.

The mercury switch OA and associated mercury switches OB, PA and Q are shown in Fig. 4 as mounted on an oscillating disc N'' which may be similar to the disc N of Fig. 1, and may be oscillated in the same manner by a timing motor M, when the latter is energized. The switch OB has terminals extending into its left end only and those terminals are connected to the conductors 33 and 34 as are the terminals O' of the switch O of Fig. 1. The switch PA of Fig. 4 differs from the switch P of Fig. 1 in that it has no terminals extending into its right end. The left end terminals of the switch PA are connected to conductors 43 and 44 as and for the same purpose as in Fig. 1. The switch Q of Fig. 4 may be identical in form and function with the switch Q of Fig. 1.

The arrangement shown in Fig. 4 differs operatively from that shown in Fig. 1 in that the field windings 25 and 27 of the valve motor D and the field windings 31 and 32 of the reset motor G are energized independently, and in such manner that there is no current flow through the windings 25 and 27 during the periods in which the windings 31 and 32 are energized.

The apparatus illustrated in Fig. 5 differs from that illustrated in Fig. 4, in that the reset motor field windings 31 and 32 are connected to relay switch members 19' and 20', respectively, which are separate from the relay switch members 19 and 20 to which the field windings of the motor D are connected. As shown in Fig. 5, the switches 19' and 20' are closed by the energization of relay windings JA' and JA², respectively, which are connected in parallel with the windings J' and J² to the same energizing means.

Subject matter relating to the provision of the condensers 89, 90 and 95 for minimizing and/or eliminating hum in the operation of the triodes V² and V³ and the associated relay windings J¹ and J² is being disclosed and claimed in my copending application bearing Serial No. 793,678, filed December 24, 1947.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. An electric proportioning control system comprising in combination a controlled device, first, second and third resistances, a separate slider contact engaging and adjustable along each of said resistances, a fourth resistance, connecting means to connect each of said resistances to a source of alternating current, a reversible electric control motor for adjusting said device and for simultaneously adjusting the contact engaging said first resistance, a reversible electric reset motor for adjusting the contact engaging the second resistance, means adjusting the contact engaging the third resistance in accordance with variations in a control condition, means connecting an intermediate point of said fourth resistance and said contacts in series in a control circuit, mechanism including timing means for maintaining said control motor in an operative condition and said reset motor in an inoperative condition during periods alternating with periods in which it maintains said reset motor in an operative position and said control motor in an inoperative condition, voltage adjusting means included in said connecting means and actuated by said timing means and arranged to make the voltage impressed by said source on said first and second resistances higher during the periods in which the reset motor is maintained in its operative condition than during the periods in which said control motor is maintained in its operative condition, means responsive to current flow in said control circuit during any of the last mentioned periods for energizing said control motor for operation to adjust the contact engaging said first resistance in the direction to interrupt said current flow and for correspondingly adjusting said device, and means responsive to current flow in said control circuit for energizing said reset motor during periods in which said reset motor is maintained in its operative condition to adjust the contact engaging the second resistance in the direction to interrupt the last mentioned current flow.

2. A control system as specified in claim 1, including means for maintaining the average sensitivity of the means responsive to current flow in the control circuit higher during periods in which the reset motor is maintained in its operative condition than during the alternating periods.

3. A control system as specified in claim 1, including means for making the sensitivity of the means responsive to current flow in the control circuit higher during an initial portion of each period in which the control motor is maintained in its operative condition than during the final portion of said period.

4. A control system as specified in claim 1, including switch means periodically actuated by said timing means to make the sensitivity of the means responsive to current flow in the control circuit greater during periods in which the reset motor is maintained in its operative condition and in the initial portions of the alternate periods than during the remaining portions of the last mentioned periods.

5. A control system as specified in claim 1, in which said first and second resistances are included in one bridge circuit and in which said third and fourth resistances are included in a second bridge circuit.

6. A control system combination as specified in claim 1, in which said timing means comprises a motor and a plurality of switches periodically opened and closed by said motor and means associated with the different switches for maintaining the two motors in operative and inoperative conditions and for varying the voltage impressed on said first and second resistances as specified in claim 1.

7. An electric proportioning control system comprising in combination a controlled device, first, second and third slide wire resistances, a separate slider contact engaging and adjustable along each of said slide wire resistances, a fourth resistance, connecting means adapted to connect each of said resistances to a source of alternating current, a reversibly rotatable electric control motor for adjusting said device and for simultaneously adjusting the contact engaging said first resistance, a reversibly rotatable electric reset motor for adjusting the contact engaging the second resistance, means adjusting the contact engaging the third resistance in accordance with variations in a control condition, means connecting an intermediate point of said fourth resistance and said contacts in series in a control circuit, mechanism including timing means adapted to maintain each of said motors in operative and inoperative conditions during successive periods alternating with successive periods in which the other motor is maintained in inoperative and operative conditions respectively, means responsive to current flow in said control circuit during a period in which the control motor is maintained in its operative condition for energizing said control motor for operation to adjust the contact engaging said first resistance in the direction to interrupt said current flow and for correspondingly adjusting said device, and means responsive to current flow in said control circuit during periods in which said reset motor is maintained in its operative condition for energizing the latter for operation to adjust the contact engaging the second resistance in the direction to interrupt the last mentioned current flow.

8. A control system combination as specified in claim 7, in which said timing means comprises a motor and a plurality of mercury switches and a rocking support for said switches periodically oscillated back and forth by said timing means to maintain each of said motors in operative and inoperative conditions as specified in claim 7.

9. An electric proportioning control system comprising in combination a controlled device, first, second and third resistances, a separate slider contact engaging and adjustable along each of said resistances, a fourth resistance, connecting means adapted to connect each of said resistances to a source of alternating current, a reversible electric control motor for adjusting said device and for simultaneously adjusting the contact engaging said first resistance, a reversible electric reset motor for adjusting the contact engaging the second resistance, means adjusting the contact engaging the second resistance, means adjusting the contact engaging the third resistance in accordance with variations in a control condition, means connecting an intermediate point of said fourth resistance and said contacts in series in a control circuit, each of said motors including two windings and adapted to be operated in one direction or in the opposite direction accordingly as one or the other of said windings is energized, means including a relay switch adapted when actuated to connect one winding of one motor in series with one winding of the second motor to an energizing source, means including a second relay switch adapted when actuated to connect the other windings of the two motors in series to said energizing source, phase discriminating means responsive to current flow in said control circuit for closing one or the other of said relay switches accordingly as said current flow is of one phase or a phase displaced 180° from the first mentioned phase, and means for periodically establishing and interrupting a short circuit about the windings of one of said motors, the windings of the two motors being so relatively proportioned and disposed that when either relay switch is actuated during a period in which the windings of said one motor are short circuited, the current flow through the corresponding windings of the two motors will be large enough to operatively energize the winding of said one motor and too small to operatively energise the winding of the second motor, and when either relay is actuated during a period in which the windings of said one motor are short circuited, so that the current flow through the corresponding winding of the second motor will be large enough to operatively energize that winding.

10. In the operation of a proportioning system adapted to return the value of a controlling quantity to a predetermined value on a departure therefrom and comprising a circuit network, means operative to adjust said network on and in accordance with a change in said controlling quantity, a control device, a control motor operative to adjust said device and to proportionally adjust said network, and a reset motor operative to adjust said network, the method which consists in operating each of said motors during alternating periods in which the other motor is inoperative, to rebalance said network and at the end of each of said periods subjecting said circuit to an adjusting action which will or will not unbalance said network accordingly as the actual value of the controlling quantity is then different from or equal to said predetermined value.

11. In the operation of a proportioning control system comprising a circuit network with different points thereof at different potentials and comprising contacts engaging and adjustable over said network, means for adjusting one of said contacts so as to vary its potential on and in accordance with variations in the value of a controlling quantity, a control motor operative to adjust said device and to simultaneously adjust a second contact to vary the potential thereof in accordance with the adjustment of said device, and a reset motor for adjusting a third contact, said network being in a balanced or unbalanced condition accordingly as the potential difference between said one contact and a predetermined fixed point of the network is or is not equal to the potential difference between the potentials of the other two contacts, the method which comprises the step of operating each motor during periods in which the other is inoperative and alternating with periods in which the last mentioned motor is operative, to rebalance the network if then unbalanced, and the step of adjusting said network at the end of each of said periods to similarly increase the potentials of the second and third contacts at the ends of periods alternating with periods in which said potentials are similarly reduced, whereby each such network adjustment will unbalance the circuit if previously balanced unless the three contacts and said predetermined point are all at the same potential.

12. An electric proportioning system adapted to return the value of a control quantity to a predetermined value on a departure therefrom and comprising in combination a circuit network, connecting means to connect said network to a source of energizing current, means operative to adjust said network on and in accordance with a change in said controlling quantity, a control device, a control motor arranged to adjust said device and to proportionally adjust said network when operated, a reset motor arranged to adjust said network when operated, means responsive to a condition of network balance or unbalance, dependent on the potentials at predetermined points of said network, for operating each of said motors during alternating periods in which the other motor is inoperative, if said network is then unbalanced, so as to rebalance said network, and cyclically operating means actuated at the end of each of said periods to subject said circuit to an adjusting action which will or will not unbalance said network accordingly as the actual value of the controlling quantity is then different from or equal to said predetermined value.

13. A control system as specified in claim 1, in which said first and second resistances are included in one bridge circuit and in which said third and fourth resistances are included in a second bridge circuit, and in which said second bridge circuit includes resistance adjustable to vary the ratio between a variation in said control condition and the resultant operation of said control motor.

14. A control system as specified in claim 1, in which said first and second resistances are included in one bridge circuit and in which said third and fourth resistances are included in a second bridge circuit, and in which said voltage adjusting means includes resistance inserted into and removed from said one bridge circuit by said timing means to decrease and increase the voltage impressed on said first and second resistances.

15. An electric proportioning system comprising in combination a balanced network, a control device, a control motor operating when rendered operative to effect a balancing adjustment of said network if the latter is then unbalanced and to effect a proportional adjustment of said control device, a reset motor operating when rendered operative to effect a rebalancing adjustment of said network if the latter is then unbalanced, means responsive to the value of a control quantity and operative on a change in said value to effect an unbalancing adjustment dependent in magnitude and direction on the magnitude and direction of said change, cyclically operating mechanism for rendering each of said motors operative and the other motor inoperative during alternating periods and for effecting a network adjustment at the beginning and for effecting a reverse network adjustment at the end of each period in which one of said motors is rendered operative, each of the last mentioned adjustments being adapted to unbalance said network if balanced when said adjustment is initiated, unless said quantity then has a predetermined value, and means for adjusting said network to vary the ratio between a change in said value and the resultant adjusting operation of said control motor.

WILLIAM H. WANNAMAKER, JR.

REFERENCES CITED

The following references are of record in the file of this patent:

UNITED STATES PATENTS

| Number | Name | Date |
|---|---|---|
| 2,334,537 | Brown et al. | Nov. 16, 1943 |
| 2,390,793 | Jones | Dec. 11, 1945 |